United States Patent
Yamada et al.

(10) Patent No.: US 7,328,877 B2
(45) Date of Patent: Feb. 12, 2008

(54) SEAT SLIDE APPARATUS FOR A VEHICLE

(75) Inventors: Yukifumi Yamada, Toyota (JP); Hideo Nihonmatsu, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 4 days.

(21) Appl. No.: 11/311,661

(22) Filed: Dec. 20, 2005

(65) Prior Publication Data

US 2006/0131470 A1 Jun. 22, 2006

(30) Foreign Application Priority Data

Dec. 20, 2004 (JP) ............................. 2004-367970
Dec. 22, 2004 (JP) ............................. 2004-370430

(51) Int. Cl.
*F16M 13/00* (2006.01)
(52) U.S. Cl. ..................................... 248/430; 297/344.1
(58) Field of Classification Search ................ 248/430, 248/424, 429; 297/344.1
See application file for complete search history.

(56) References Cited

U.S. PATENT DOCUMENTS

| 4,817,904 | A | 4/1989 | Munakata et al. | |
|---|---|---|---|---|
| 7,066,521 | B2* | 6/2006 | Jung et al. | 296/65.13 |
| 7,147,195 | B2* | 12/2006 | Danjo et al. | 248/430 |
| 2002/0060281 | A1* | 5/2002 | Okazaki et al. | 248/424 |
| 2003/0230696 | A1* | 12/2003 | Yamada et al. | 248/424 |
| 2004/0026975 | A1* | 2/2004 | Rausch et al. | 297/344.1 |

FOREIGN PATENT DOCUMENTS

| JP | 57-194121 | 11/1982 |
|---|---|---|
| JP | 2002-160554 | 6/2002 |

OTHER PUBLICATIONS

European Search Report dated Mar. 22, 2006.

* cited by examiner

*Primary Examiner*—Ramon O Ramirez
(74) *Attorney, Agent, or Firm*—Buchanan Ingersoll & Rooney PC

(57) ABSTRACT

A seat slide apparatus for a vehicle includes a first rail fixedly mounted on a vehicle, a second rail secured to a seat and mounted to be rotatable relative to the first rail, a sliding member arranged between the first rail and the second rail and slidably movable in response to a relative movement between the first rail and the second rail, and a lock member associated with the second rail and movable with the second rail, the lock member provided to be engageable with engagement bores provided at the first rail and the second rail and being biased in a direction to be engaged with the engagement bores, the lock member being accommodated in a space defined by the first rail and the second rail.

19 Claims, 8 Drawing Sheets

SEAT SLIDE APPARATUS FOR A VEHICLE

CROSS REFERENCE TO RELATED APPLICATIONS

This application is based on and claims priority under 35 U.S.C. § 119 with respect to Japanese Patent Application 2004-367970, filed on Dec. 20, 2004, and Japanese Patent Application 2004-370430, filed on Dec. 22, 2004, the entire content of which is incorporated herein by reference.

FIELD OF THE INVENTION

This invention generally relates to a seat slide apparatus for a vehicle.

BACKGROUND

As one of examples, US2004-0026975 (a first reference) discloses a motor vehicle seat that is known as this type of seat slide apparatus. In this motor vehicle seat, an upper rail secured to a seat is relatively movably mounted on a lower rail fixed on a vehicle body such as a vehicle floor. A lock unit, which incorporates, therein, plural lock pins and lock springs, is fixedly attached onto the upper rail. Plural engagement bores are formed at an undersurface of the lower rail, the plural engagement bores which are operatively engaged with the plural lock pins for the purpose of restraining or locking a longitudinal movement of the upper rail relative to the lower rail. When at least one of the plural lock pins is selectively engaged, in response to a longitudinal position of the upper rail relative to the lower rail, with the corresponding one of the plural engagement bores of the lower rail, it is possible to adjust finely a relative position of the upper rail relative to the lower rail, i.e., a position of the seat relative to the vehicle body such as the vehicle floor.

As another example, JPS57(1982)-194121A1 (a second reference, corresponding to U.S. Pat. No. 4,817,904A) discloses a seat slide apparatus for a vehicle that is known as this type of seat slide apparatus. In this seat slide apparatus, an upper rail secured to a seat is operatively mounted on a lower rail and is movable relative to the lower rail via rollers secured to the lower rail by retainers. The lower rail is provided with longitudinally extending series of holes at a side wall thereof. The seat slide apparatus is further provided with a lock member (described as a latch member in this reference) which is normally biased sidewise to be engaged with the holes of the lower rail. The upper rail is associated with this lock mechanism via an operation lever. That is, when the lock mechanism is moved rearward on the lower rail in response to operation of the operation lever, the engagement between the lock member and the holes of the lower rail is released so that the upper rail becomes movable relative to the lower rail.

As still another example, JP2002-160554A (a third reference) discloses a seat track device for a vehicle seat that is known as this type of seat slide apparatus. In this seat track device, attention is focused on reducing a degree of sliding friction applied to retainers, the sliding friction which may occur due to relative movement of an upper rail relative to a lower rail, and on stabilizing a degree of sliding friction applied thereto. Although the retainers include a changed structure in the light of the foregoing, the other configuration of the device is substantially identical to the one disclosed in the second reference. This seat track device is provided with a lock member (described as a lock lever in this reference) for restraining or locking a longitudinal movement of the upper rail relative to the lower rail, and are operatively engaged with lock holes formed at both the upper rail and the lower rail.

However, according to the motor vehicle seat disclosed in the first reference; a mechanism, by which the lock pins are engaged with the engagement bores (i.e., a lock unit), incorporates a great number of components therein. Therefore, it may undesirably results in requirement of a sufficiently large space for accommodating the lock unit. In such circumstances, it is difficult to downsize the mechanism.

According to the seat slide apparatus disclosed in the second reference, the lock member, which is mounted outside of the lower rail and the upper rail, causes greatening an entire structure of the seat slide apparatus. In such circumstances, it is difficult to downsize. Moreover, because the holes to be engaged by the lock member are formed only at the lower rail, it may be difficult to exert a sufficient degree of shear strength during a rail lock condition. For example, in the event that a vehicle is subjected to an unexpectedly large load, such as at a vehicle impact, it may cause a deformation in the lock member. Consequently, the lock member cannot exert a sufficient degree of locking strength.

According to the seat track device in the third reference, because the lock holes, which are engaged with the lock member, are formed at both the upper rail and the lower rail, a degree of locking strength can be enhanced. Meanwhile, because the retainers are attached on the same surface in which an operation position of the lock mechanism appears, the retainers are required to assure a longitudinal length that corresponds to a longitudinal operation length of the lock member. It may hence undesirably elongate a longitudinal length of the retainers. Moreover, likewise as the second reference, the lock member is mounted outside of the lower rail and the upper rail. Therefore, a difficulty in downsizing still remains.

The present invention has been made in view of the above circumstances, and provides a seat slide apparatus for use in a vehicle, which can adjust finely a position of a seat and is further downsized.

SUMMARY

According to an aspect of the present invention, a seat slide apparatus for a vehicle includes: a first rail fixedly mounted on a vehicle; a second rail secured to a seat and mounted to be rotatable relative to the first rail; a sliding member arranged between the first rail and the second rail and slidably movable in response to a relative movement between the first rail and the second rail; and at least one lock member associated with the second rail and movable with the second rail. The lock member is provided to be engageable with engagement bores provided at the first rail and the second rail and is biased in a direction to be engaged with the engagement bores. The lock member is accommodated in a space defined by the first rail and the second rail.

The at least one lock member can include: a first lock member and a second lock member, and one of the first lock member and the second lock member is selectively engaged with the engagement bores.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings.

Figure 2:
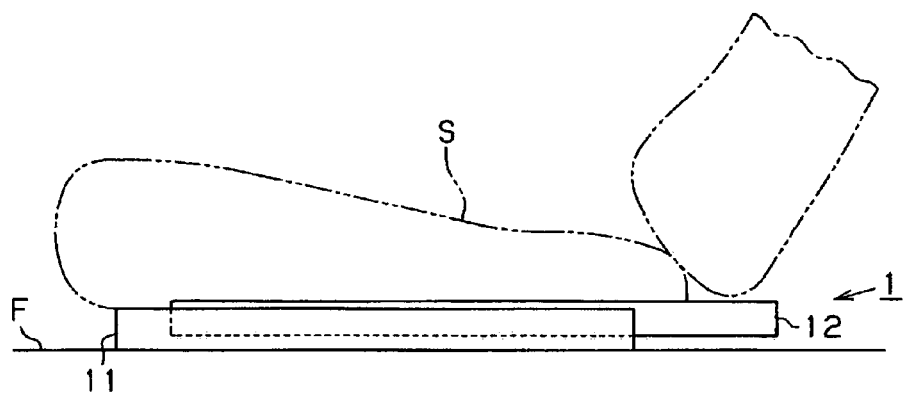
FIG. 2 is a side view illustrating a front seat of a vehicle, which is attached with the seat slide apparatus according to embodiments of the present invention.

Seat slide apparatus 1 according to a first embodiment of the present invention can be preferably mounted, making a lateral pair, under a seat S of a vehicle. In order to simplify the description and illustration, of the seat slide apparatus 1, FIG. 2 illustrates only one seat slide apparatus 1 which configures the lateral pair and is mounted at the left side under the seat S, and the description will be exhibited only for the seat slide apparatus 1 at the left side of the seat S. It is, however, to be understood that both seat slide apparatus 1 possess the same general configuration and so the description below applied to both seat slide apparatus 1.

The seat slide apparatus 1 is provided with a lower rail 11, which is fixedly mounted on a vehicle body such as a floor F and extends in a longitudinal direction, and an upper rail 12, which is secured to a bottom surface of the seat S and is mounted to be movable relative to the lower rail 11. According to the first embodiment of the present invention, the lower rail 11 serves as a first rail while the upper rail 12 serves as a second rail. Directions, such as "longitudinal", "lateral" and "vertical", which are mentioned herein, correspond to an orientation of a vehicle.

Figure 1:
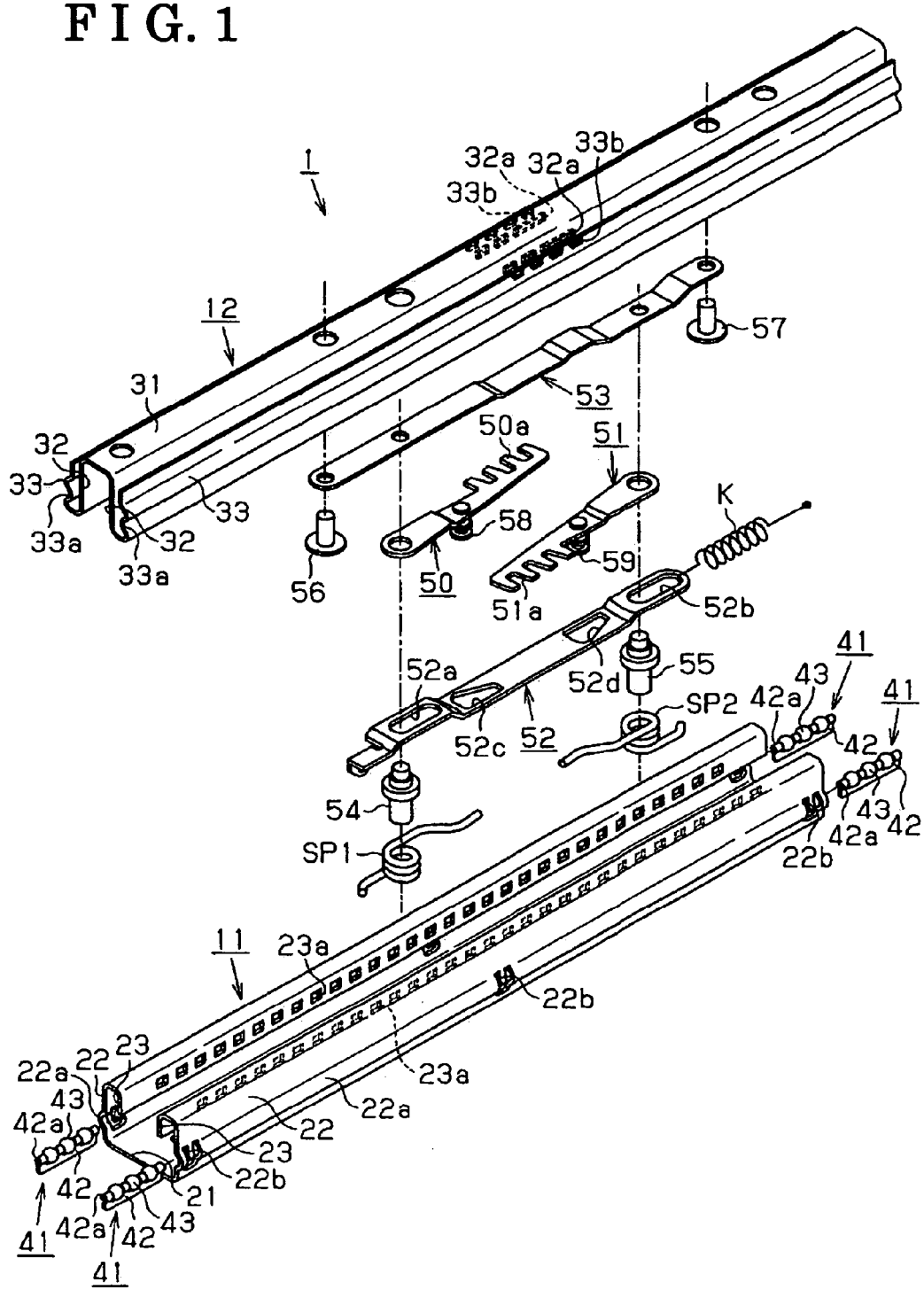
FIG. 1 is an exploded perspective view illustrating a configuration of a seat slide apparatus adjusted to a vehicle according to a first embodiment of the present invention.

As illustrated in FIG. 1, the lower rail 11 includes a bottom wall 21 fixed to the floor F of the vehicle, first side walls 22 extending upwards from left and right ends of the bottom wall 21 and making a lateral pair, and second side walls 23 formed by bending downwards upper end portions of the first side walls 22 and making a lateral pair. The lower rail 11 hence exhibits a laterally symmetrical cross section extending in a longitudinal direction. The upper rail 12 includes an upper wall 31 secured to the seat S, first side walls 32 extending downwards from left and right ends of the upper wall 31 and making a lateral pair, and second side walls 33 formed by bending upwards lower end portions of the first side walls 32 and making a lateral pair. The upper rail 12 hence exhibits a laterally symmetrical cross section extending in the longitudinal direction. The lower rail 11 and the upper rail 12 are mechanically associated with each other in such a manner that the second side walls 23 of the lower rail 11 are interposed between the corresponding first side wall 32 and the corresponding second side wall 33, of the upper rail 12.

Two sliding members 41 are provided between the first side wall 22 of the lower rail 11 and the second side wall 33 of the upper rail 12 at each side (left and right) of the seat slide apparatus 1, the sliding members 41 which are slidably movable in response to a longitudinal movement of the upper rail 12 relative to the lower rail 11. Each sliding member 41 is an assembly having a flat plate-type retainer 42 exhibiting adequate rigidity and made of metal material and at least one spherically-shaped roller 43 exhibiting adequate rigidity. The roller 43 is supported to be freely rotatable by a curled portion 42a formed at an upper end of the retainer 42. According to the first embodiment of the present invention, provided are three rollers 43 attached, longitudinally equidistant from each adjacent one, to the curled portion 42a of the retainer 42.

At the one side, and the other side, of the seat slide apparatus 1 respectively, the first side wall 22 of the lower rail 11 is formed with an arc-shaped cross sectional portion 22a which supports the rollers 43 for their free rotation, while the second side wall 33 of the upper rail 12 is formed with an arc-shaped cross sectional portion 33a which also supports the rollers 43 for their free rotation. As is apparent from FIG. 3, the rollers 43 of each sliding member 41 are press-fitted into a space between the arc-shaped cross sectional portions 22a and 33a. At a time that the rollers 43 rotate between the arc-shaped cross sectional portions 22a and 33a in response to a movement of the upper rail 12 relative to the lower rail 11, each sliding member 41 is translated in the longitudinal direction with the upper rail 12.

As illustrated in FIG. 1, at least one stopper 22b is formed or provided at the arc-shaped cross sectional portion 22a of the first side wall 22 of the lower rail 11, at the one side, and at the other side, of the seat slide apparatus 1 respectively. According to the first embodiment of the present invention, provided are three stoppers 23b; a first one of which is positioned at a longitudinal front end of the lower rail 11; a second one of which is positioned at a longitudinal rear end of the lower rail 11; and a third one of which is positioned at a substantially longitudinal intermediate portion of the lower rail 11. Once the curled portion 42a of the retainer 42 of each sliding member 41 comes in contact with the stopper 22b of the lower rail 11, each sliding member 41 is restrained from further movement in the longitudinal direction. In other words, according to the first embodiment of the present invention, an operational range of each sliding member 41 is designed to substantially meet a half of the entire length of the lower rail 11. In this case, for example, each sliding member 41 can be translated half of an operation distance of the upper rail 12 relative to the lower rail 11.

Next, described below is a lock mechanism according to the first embodiment of the present invention.

As is illustrated in FIG. 1, incorporated between a space defined by the lower rail 11 and the upper rail 12 are two lock members which physically lock the upper rail 11 and the lower rail 12 at plural lock positions and restrain or lock a longitudinal movement of the upper rail 12 relative to the lower rail 11. The space defined by the lower rail 11 and the upper rail 12 represents herein an inner space defined by the bottom wall 21 of the lower rail 11, the pair of first side walls 22 of the lower rail 11, the sliding members 41, the pair of second side walls 33 of the upper rail 12, the pair of first side walls 32 of the upper rail 12, and the upper wall 31 of the upper rail 12 (see FIG. 3).

Each lock member 50 and 51 is operatively associated with the upper rail side 12. More specifically, each lock member 50 and 51 is operatively associated with an operation plate 52 and is secured to the upper rail 12 via a base plate 53 supporting the operation plate 52 to be movable in the longitudinal direction. The operation plate 52 and the base plate 53 are formed to be an approximately long plate made of metal material having adequate rigidity. The operation plate 52 is supported by the base plate 53 by means of pins 54 and 55. The base plate 53 is secured to the upper rail 12 by means of rivets 56 and 57. The lock members 50 and 51 are provided as a lock unit having the operation plate 52, the base plate 53, the pins 54 and 55, the rivets 56 and 57 and springs SP1 and SP2 (described later). This lock unit is then secured to the upper rail 12 by means of the rivets 56 and 57.

Each lock member 50 and 51 is made of metal material exhibiting adequate rigidity and is formed to be substantially comb-shaped. More specifically, the lock member 50 is formed with lock teeth 50a to be engageable with engagement bores 23a of the lower rail 11 and engagement bores 32a and 33b of the upper rail 12. Likewise, the lock member 51 is formed with lock teeth 51a to be engageable with the engagement bores 23a, 32a and 33b. The engagement bores 23a, 32a and 33b are described in detail later. The lock teeth 50a and 50b are constantly biased by the corresponding elastic bodies SP1 and SP2 in a direction to be engaged with the engagement bores 23a, 32a and 33b. This direction to be engaged with the engagement bores corresponds to a lock direction. According to the first embodiment of the present invention, the lock members 50 and 51 are arranged in a symmetrical manner about a point with each other, and are biased in the lock directions towards the lateral sides of the lower rail 11, and of the upper rail 12, the lock directions which are not identical to each other.

The lock members 50 and 51 are arranged in a vertical space between the operation plate 52 and the base plate 53 and are pivotably supported by means of the pins 54 and 55, respectively. The lock members 50 and 51 are operatively pivoted at horizontal surfaces with the pins 54 and 55 as pivot axes. According to the first embodiment of the present invention, the lock teeth 50a of the lock member 50 are mounted at a vertically higher surface than the lock teeth 51a of the lock member 51, i.e., are mounted closer to the bottom surface of the seat S than the lock teeth 51a of the lock member 51 are. Consequently, the lock teeth 50a are pivoted at a horizontal surface which is different from the one of the lock teeth 51a. The operation plate 52 is provided with oblong bores 52a and 52b at longitudinal both ends thereof. The pins 54 and 55 being fitted into the oblong bores 52a and 52b are fixed to the base plate 53 in a condition where the lock members 50 and 51 are pivotally supported by the pins 54 and 55. Therefore, by virtue of the pins 54 and 55 fitted into the oblong bores 52a and 52b, which serve as guides, the operation plate 52 is restrained or locked from vertical and lateral movements and is allowed to move only in the longitudinal direction.

The operation plate 52 is formed or provided with sloped bores 52c and 52d which are positioned at an approximately central portion of the operation plate 52 and adjacent to the oblong bores 52a and 52b. The sloped bores 52c and 52d respectively exhibit a flat and approximately triangle shape and possess different lateral widths at front and rear ends thereof. More specifically, each sloped bore 52c and 52d possess a superior or large lateral width at a front end thereof and an inferior or small lateral width at a rear end thereof. As illustrated in FIG. 1, the sloped bores 52c and 52d are fitted with guide pins 58 and 59 securely attached to the lock members 50 and 51. In response to a longitudinal movement of the operation plate 52, the guide pin 58 can shift along an inner wall surface between the front end having the large lateral width and the rear end having the small lateral width, of the sloped bore 52c, while the guide pin 59 can shift along an inner wall surface between the front end having the large lateral width and the rear end having the small lateral width, of the sloped bore 52d.

When each guide pin 58 and 59 shifts to the front end having the large lateral width of each sloped bore 52c and 52d, each lock member 50 and 51 is pivoted to a lock position, which corresponds to the engagement position of each lock teeth 50a and 51a with the engagement bores 23a, 32a and 33b. When each guide pin 58 and 59 shifts to the rear end having the small lateral width of each sloped bore 52c and 52d, each lock member 50 and 51 is pivoted to a unlock position (a disengagement position). That is, when the each guide pin 58 and 59 shifts along each sloped bore 52c and 52d in response to a longitudinal movement of the operation plate 52, each lock member 50 and 51 is operated to lock and unlock a relative movement between lower rail 11 and the upper rail 12 with each pin 58 and 59 as a pivot axis. According to the first embodiment of the present invention, each guide pin 58 and 59 is attached to each lock member 50 and 51 as an independent component. Alternatively or in addition, each guide pin 58 and 59 can be integrally formed with each lock member 50 and 51, such as a projection.

As illustrated in FIG. 1, the operation plate 52 is connected with an initial position return elastic body k for biasing constantly the operation plate 52 in such a manner that the guide pins 58 and 59 are shifted towards the front ends having a large lateral width, i.e., in the lock direction. When the operation plate 52 is operated, in response to operation of an operation handle (not illustrated), against a biasing force of the initial position return elastic body k, it is possible to operate each lock member 50 and 51 to unlock a relative movement of the upper rail 12 and the lower rail 11. On the other hand, once the operation of the operation handle is discontinued after the aforementioned operation of the operation plate 52, each lock member 50 and 51 can be returned to, or maintained at, a lock position by virtue of a biasing force of the initial position return elastic body k and a biasing force of each elastic body SP1 and SP2 biasing each lock member 50 and 51 to the lock direction.

According to the first embodiment of the present invention, each elastic body SP1 and SP2 is configured with a torsion spring. More specifically, each torsion spring SP1 and SP2 is fitted into each pin 54 and 55 and one end of each is hooked at each guide pin 58 and 59. Therefore, each torsion spring SP1 and SP2 effectively bias each lock member 50 and 51 in the lock direction, i.e., in a counterclockwise direction in FIG. 4.

Figure 4:
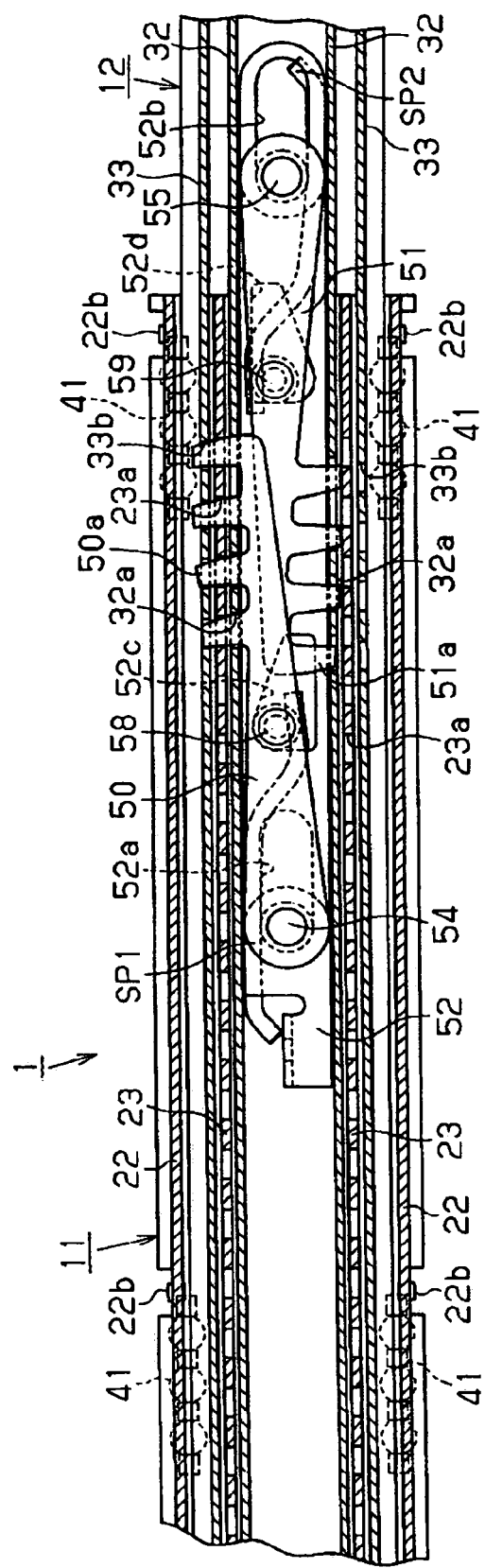
FIG. 4 is an overhead cross sectional view illustrating the seat slide apparatus according to the first embodiment.

The lock members 50 and 51 are movable in response to slide movement of the upper rail 12. When the upper rail 12 is positioned at or in the vicinity of engagement positions of the lock teeth 50a with the engagement bores 23a, 32a and 32b, the lock teeth 50b are not engaged with the engagement bores 23a, 32a and 32b. When the upper rail 12 is positioned at or in the vicinity of engagement positions of the lock teeth 50b with the engagement bores 23a, 32a and 32b, the lock teeth 50a are not engaged with the engagement bores 23a, 32a and 32b. Next, described below is a relationship between engagement operation positions of the lock member 50 and the lock member 51 and positions of the engagement bores 23a, 32a and 33b formed at the lower rail 11 and the upper rail 12. As illustrated in FIG. 4, the pair of second side walls 23 of the lower rail 11 is provided with the engagement bores 23a extending continuously and longitudinally with a pitch equally spaced between each adjacent bore 23a over a longitudinal movement range of the upper rail 12 and in a symmetrical manner in a vehicle lateral direction. More specifically, the engagement bores 23a are formed at the one (e.g., an upper side in FIG. 4) of the second side walls 23 having a longitudinal pitch relative to each adjacent bore 23a, the longitudinal pitch which is substantially identical to the one at the other one (e.g., a lower side in FIG. 4) of the second side walls 23. Therefore, the engagement bores 23a of the one of the second side walls 23 are arranged in a substantially laterally symmetric manner relative to the engagement bores 23a of the other one of the second side walls 23. Meanwhile, the position, at which each the lock member 50 and the lock member 51 is engaged with the first and second side walls 32 and 33 of the upper rail 12, is shifted, between the lock members 50 and 51, half of the equally spaced longitudinal pitch for the engagement bores 23a of the lower rail 11. More specifically, the engagement bores 32a are formed at the one (e.g., an upper side in FIG. 4) of the first side walls 32 are shifted, relative to the engagement bores 32a formed at the other one (e.g., a lower side in FIG. 4) of the first side walls 32, half of the equally spaced longitudinal pitch for the engagement bores 23a. Likewise, the engagement bores 33b are formed at the one (e.g., the upper side in FIG. 4) of the second side walls 33 are shifted, relative to the engagement bores 33b formed at the other one (e.g., the lower side in FIG. 4) of the second side walls 33. The lock teeth 50a are shifted from the lock teeth 51a half of the equally space longitudinal pitch for the engagement bores 23a.

Here, assigning "p" as the pitch of the engagement bore 23a of the lower rail 11 and assigning "L" as a longitudinal distance between an axis, of the pin 54 and the pin 55, the distance between the axis, of the pin 54 and the pin 55 is expressed by an equation: $L=p(n+\frac{1}{2})$. Herein, any integer should be assigned as "n". According to the first embodiment of the present invention, the engagement bores 32a and 33b are positioned at the upper rail 12 in such a manner that the lock teeth 50a and 51a of each lock member 50 and 51 are respectively engaged therewith, such as approximately longitudinally intermediate positions of the upper rail 12.

As described above, because the engagement bores 23a, 32a and 33b are formed corresponding to the engagement operation position of each lock member 50 and 51, it is possible to selectively engage the lock teeth 50a or 51a with the engagement bores 23a, 32a and 33b. Consequently, it is possible to implement an adjustment of a longitudinal position of the upper rail 12 relative to the lower rail 11 every half of the pitch p of the engagement bores 23a.

Figure 3:
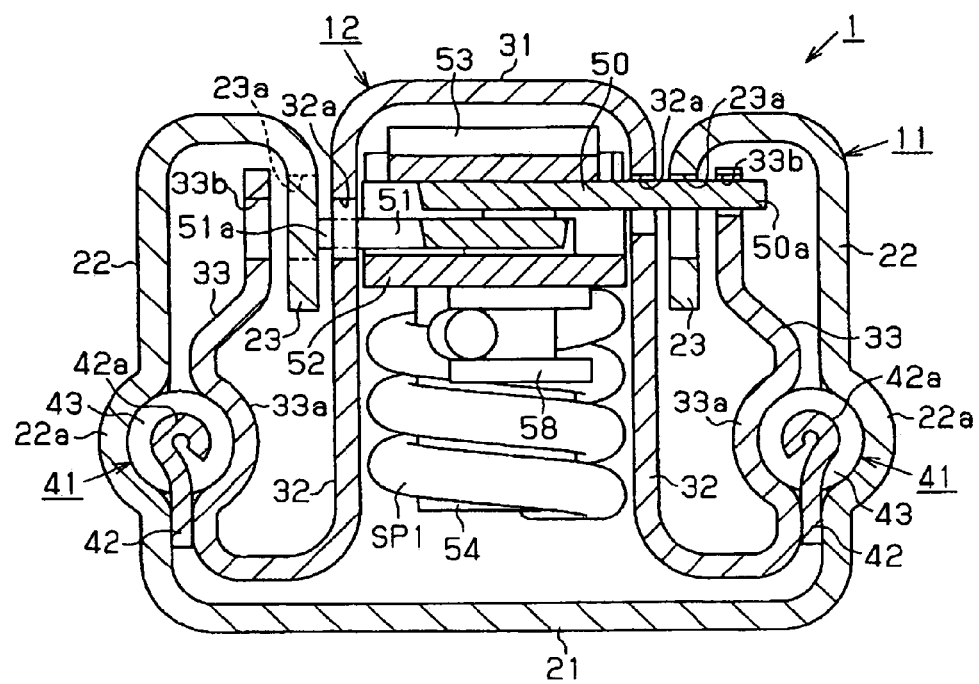
FIG. 3 is a longitudinal cross sectional view illustrating the seat slide apparatus according to the first embodiment.

Here, it can be underlined that, the lock teeth 50a (alternatively or in addition the lock teeth 51a) are engaged with the engagement bores 23a, 32a and 33b crossing over the second side wall 23 of the lower rail 11, and the first and second side walls 32 and 33 of the upper rail 12. That is, as illustrated in FIGS. 3 and 4, because each lock teeth 50a and 51a are engaged with the engagement bores 33b of the second side wall 33 of the upper rail 12 as well as with the engagement bores 32a of the first side wall 32 of the upper rail 12 and the engagement bores 23a of the second side wall 23 of the lower rail 11, a lock mechanism of each lock member 50 and 51 becomes a bar-tacking structure. In such a case, compared with a structure in which each lock teeth 50a and 51a are engaged with a single side wall of the lower rail 11 and a single side wall of the upper rail 12, it is possible to enhance a degree of shearing strength of each lock member 50 and 51 as well as downsizing the seat slide apparatus 1, and to further enhance a degree of locking strength of each lock member 50 and 51.

Next, described below is a physical relationship between the locking position of each lock member 50 and 51 and each sliding member 41.

As illustrated in FIG. 3, according to the first embodiment of the present invention, when each lock member 50 and 51 is operated in the lock direction, a sliding position of each sliding member 41 between the lower rail 11 and the upper rail 12 does not interfere in an engagement position of each lock member 50 and 51 with the engagement bores 23a, 32a and 33b, and vice versa. More specifically, each sliding member 41 is positioned downsides of a vertically intermediate position between the lower rail 11 and the upper rail 12, while each lock member 50 and 51 is positioned upsides of the vertically intermediate position therebetween. As described above, because each sliding member 41 is positioned at a vertical height different from the one of each lock member 50 and 51, and each sliding member 41 can operate at a position not interfering in each lock member 50 and 51, vice versa, a longitudinal length of each sliding member 41 is not unnecessarily responsive to a longitudinal length of the lock mechanism and can be controlled at the minimum length possible. In other words, without being influenced by the length, of each sliding member 41 and the lock mechanism, the lengths of the lower rail 11 and the upper rail 12 can be controlled at the minimum length possible that substantially satisfies a moving amount of the upper rail 12, the same which effectively leads to further downsizing of the seat slide apparatus 1 adjusted to a vehicle.

As described above, in the seat slide apparatus 1 according to the first embodiment of the present invention, the lock teeth 50a or 51a are selectively engaged with the engagement bores 23a, 32a and 33b of the lower rail 11 and the upper rail 12. Consequently, a longitudinal movement of the upper rail 12 relative to the lower rail 11 can be effectively restrained or locked, and the seat S is hence held at a predetermined position relative to the floor F. Once the operation plate 52 is operated, in response to operation of the operation handle, against a biasing force of the initial position return elastic body k, each guide pin 58 and 59 is shifted to the rear end having the small lateral width of each sloped bore 52c and 52d against a biasing force of each elastic body SP1 and SP2, and as a consequence, each lock member 50 and 51 is operated to unlock the relative movement of the lower rail 11 and the upper rail 12. In the course thereof, the lock teeth 50a (or the lock teeth 51a) are released from being engaged with the engagement bores 23a, 32a and 33b. Therefore, the upper rail 12 is allowed to move relative to the lower rail 11, and the seat S is allowed to slide longitudinally relative to the floor F. As described above, it is possible to adjust a longitudinal position of the seat S relative to the floor F. Afterwards, by selectively engaging the lock teeth 50a or 51a with the engagement bores 23a, 32a and 33b, it is possible to finely adjust the position of the seat S every half of the pitch P of the engagement bores 23a.

At least the following effects can be exerted according to the seat slide apparatus 1 having the configuration and function described above.

(1) The plural lock members 50 and 51 (two according to the first embodiment) which lock the lower rail 11 and the upper rail 12 at plural engagement positions or stages and restrain a relative movement of the upper rail 12 relative to the lower rail 11, are housed in the space surrounded by the lower rail 11 and the upper rail 12. Therefore, it is possible to reduce an entire size of the seat slide apparatus 1 adjusted to a vehicle.

(2) When the pitch of the engagement bores 23a is assigned with "p", the longitudinal distance between the axis, of the lock member 50 and of the lock member 51 is expressed by an equation: L=p (n+½). In this case, "n" should be assigned with any integer. Either the lock teeth 50a or 51a is selectively engaged with the engagement bores 23a, 32a and 33b. Therefore, it is possible to finely adjust a longitudinal position of the seat S every half of the pitch p of the engagement bores 23a.

(3) Each sliding member 41 is positioned at a vertical position (height) being different from a vertical position (height) of each lock member 50 and 51, and each lock member 50 and 51 does not interfere in each sliding member 41, vice versa. Therefore, a longitudinal length of each sliding member 41 is not influenced by a longitudinal length of the lock mechanism, vice versa, and can be controlled at the minimum length possible. In other words, without being influenced by the length, of each sliding member 41 and the lock mechanism, the lengths of the lower rail 11 and the upper rail 12 can be controlled at the minimum length possible that substantially satisfies a moving amount of the upper rail 12, the same which effectively leads to downsizing of the seat slide apparatus 1 adjusted to a vehicle.

(4) The lock teeth 50a (alternatively or in addition the lock teeth 51a) are brought into engagement with the second side wall 23 of the lower rail 11, the first side wall 32 and the second side wall 33 of the upper rail 12. Likewise, the lock teeth 51a are brought into engagement with the second side wall 23 of the lower rail 11, the first side wall 32 and the second side wall 33 of the upper rail 12. In such a case, the lock mechanism is a bar-tacking structure, and it is possible to enhance a degree of locking strength of the lock mechanism.

(5) The lock mechanism, by which a position of the seat S can be finely adjusted, is substantially configured with the lock members 50 and 51, the operation plate 52, the pins 54 and 55, and the elastic body SP1 and SP2. Therefore, it is possible to reduce the number of components to the minimum quantity possible and reduce the manufacturing cost. More over, the reduction of the number of components effectively leads to facilitating an assembling procedure.

Figure 5:
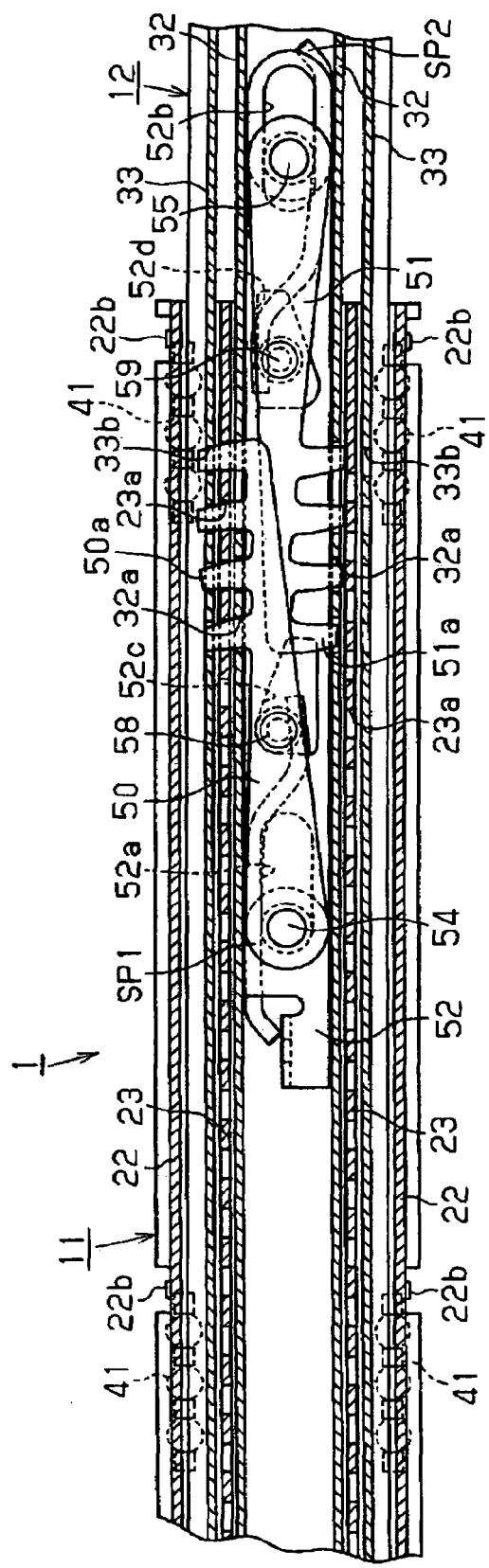
FIG. 5 is an overhead cross sectional view illustrating a seat slide apparatus according to a second embodiment.

According to a second embodiment of the present invention, as illustrated in FIG. 5, a configuration of a seat slide apparatus 1 of the second embodiment is substantially identical to the above-described configuration of the seat slide apparatus 1 of the first embodiment, and yet there is a difference therebetween in so far as the engagement operation positions of the lock members 50 and 51 and the positions of the engagement bores 23a, 32a and 33b. The components used herein in the same manner as the first embodiment are denoted with the same reference numerals.

As illustrated in FIG. 5, the engagement bores 23a are formed or provided continuously and longitudinally at the pair of second side walls 23 of the lower rail 11 with a pitch equally spaced between each adjacent bore 23a and shifted, in a longitudinal direction between the pair of second side walls 23, every half of the pitch for the engagement bores 23a. More specifically, the engagement bores 23a at the one (the upper side in FIG. 5) of the second side walls 23 of the lower rail 11 are shifted, every half of the pitch for the engagement bores 23a, relative to the engagement bores 23a at the other one (the lower side in FIG. 5) of the second side walls 23. Meanwhile, the position, at which each the lock member 50 and 51 is engaged with the first and second side walls 32 and 33 of the upper rail 12, is provided in a symmetrical manner in a vehicle lateral direction. More specifically, the engagement bores 32a of one of the first side walls 32 of the upper rail 12 (e.g., the upper side in FIG. 5) longitudinally extends in a substantially laterally symmetric manner relative to the engagement bores 32a of the other one of the first side walls 32 of the upper rail 12 (e.g., the lower side in FIG. 5). Likewise, the engagement bores 33b of the one of the second side walls 33 of the upper rail 12 (e.g., the upper side in FIG. 5) longitudinally extend in a substantially laterally symmetric manner relative to the engagement bores 33b of the other one of the second side walls 33 of the upper rail 12 (e.g., the lower side in FIG. 5). The lock teeth 50a are arranged substantially in a symmetrical manner relative to the lock teeth 51a. As described above, according to the seat slide apparatus 1 having the aforementioned structure, it is still possible, by selectively engaging either the lock teeth 50a or the lock teeth 51a with the engagement bores 23a, 32a and 33b, to implement an adjustment of a longitudinal position of the upper rail 12 relative to the lower rail 11 every half of the pitch p of the respective engagement bores 23a.

The present invention can be applied to the following examples modified on the basis of the first and second embodiments.

EXAMPLE 1

According to the first and second embodiments, provided are the two lock members at the seat slide apparatus 1 for a vehicle. Alternatively, the number of the lock members can be one, two or more than three. On the assumption that the seat slide apparatus 1 according to the first embodiment is provided with the lock members at the quantity n, the engagement bores 32a of the one of the first side walls 32 (e.g., the upper side in FIG. 4), with which the lock member is engaged, can be shifted, between each lock member, every amount arbitrarily obtained by "pitch P/the number of lock members N", relative to the engagement bores 32a of the other one of the first side walls 32 (e.g., the lower side in FIG. 4). Likewise, the engagement bores 33b of the one of the second side walls 33 (e.g., the upper side in FIG. 4), with which the lock member is engaged, can be shifted, between each lock member, every amount arbitrarily obtained by "pitch P/the number of lock members N", relative to the engagement bores 33b of the other one of the second side walls 33 (e.g., the lower side in FIG. 4). On the assumption that the seat slide apparatus 1 according to the second embodiment is provided with the lock members at the quantity n, the engagement bores 23a of the one of the second side walls 23 (e.g., the upper side in FIG. 5) are shifted every amount obtained by "pitch P/the number of lock members N", relative to the engagement bores 23a of the other one of the second side walls 23 (e.g., the lower side in FIG. 5).

EXAMPLE 2

As described above, according to the first embodiment, the lock members 50 and 51 are arranged in a symmetrical manner about a point with each other and are engaged with the engagement bores 23a, 32a and 33b at both left and right sides of the lower rail 11 and the upper rail 12. Alternatively or in addition, the lock members 50 and 51 can be engaged with the engagement bores 23a, 32a and 33b defined only at one side (left side or right side) of each the lower rail 11 and the upper rail 12.

EXAMPLE 3

As described above, according to the second embodiment, the engagement bores 23a of the one of the second side walls 23 (e.g., the upper side in FIG. 5) extend in the longitudinal direction having a longitudinal gap corresponding to a length obtained by "p/N" relative to the engagement bores 23a of the other one of the second side walls 23 (e.g., the lower side in FIG. 5). Alternatively or in addition, two rows of engagement bores 23a can be formed or provided at one of the second side walls 23 of the lower rail 11 and cab extend longitudinally at different heights. In this case, the upper row having the engagement bores 23a can be shifted, relative to the lower row having the engagement bores 23a, in a longitudinal direction every half of the pitch for the engagement bores 23a.

EXAMPLE 4

Figure 6:
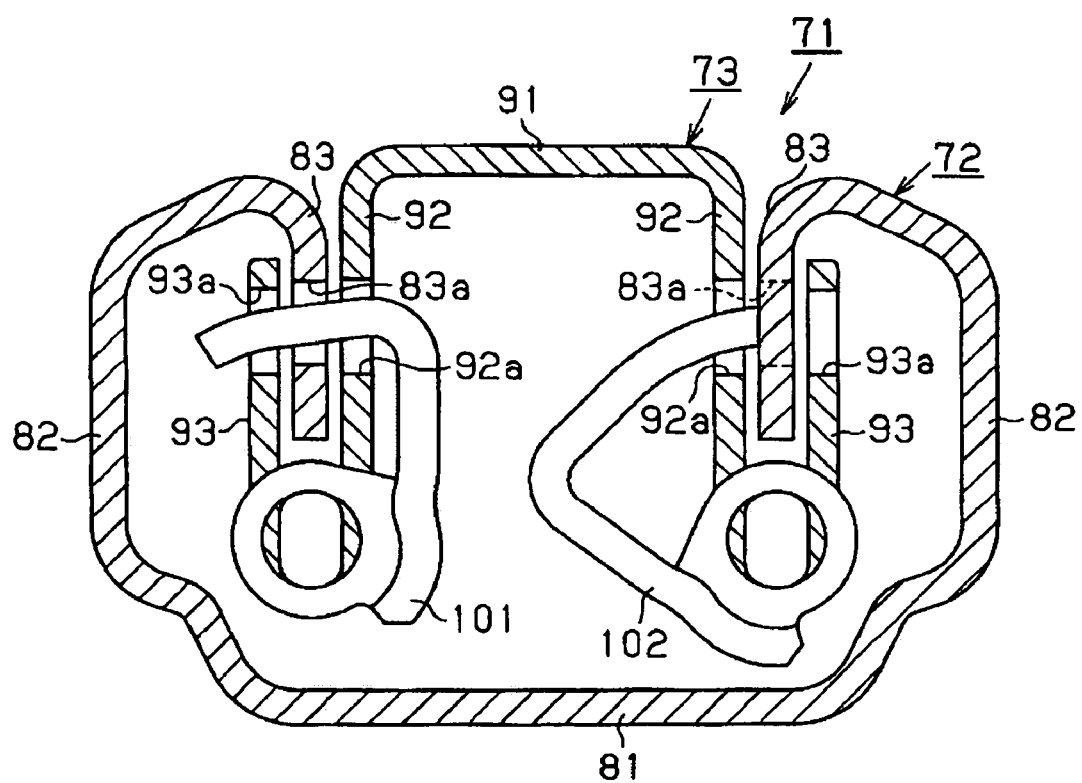
FIG. 6 is a longitudinal cross sectional view illustrating a seat slide apparatus according to an example 4.

As described above, according to the first and second embodiments, the lock members 50 and 51 are operatively pivoted at horizontal surfaces. Alternatively or in addition, the lock members 50 and 51 can be rotated at plan surfaces perpendicular to the horizontal surface. As illustrated in FIG. 6, a seat slide apparatus 71 for a vehicle is provided with a lower rail 72 and an upper rail 73 mounted on the lower rail 72 to be relatively movable in a longitudinal direction. The lower rail 72 includes a bottom wall 81, first side walls 82 extending upwards from left and right ends of the bottom wall 82 and making a lateral pair, and second side walls 83 formed by bending downwards upper end portions of the first side walls 82 and making a lateral pair. The upper rail 73 includes an upper wall 91, first side walls 92 extending downwards from left and right ends of the upper wall 91 and making a lateral pair, and second side walls 93 formed by bending upwards lower end portions of the first side walls 92 and making a lateral pair. As illustrated in FIG. 6, two lock members 101 and 102 are housed in a space defined or surrounded by the lower rail 72 and the upper rail 73, and are pivotably supported by a shaft (not illustrated) longitudinally extending at a clinch portion between the first side wall 92 and the second side wall 93 at the respective sides. Each lock member 101 and 102 is pivoted at a plan surface perpendicular to a horizontal surface. It is hence possible to selectively engage either the lock member 101 or the lock member 102 with engagement bores 83a, 92a and 93a of the lower rail 72 and the upper rail 73, by which the same effects as the above described embodiments can be exerted.

EXAMPLE 5

According to the above descriptions, the first rail is represented by the lower rail 11 fixed to the floor F and the second rail is represented by the upper rail 12 secured to the seat S. Alternatively, the first rail can be represented by the upper rail 12 fixedly mounted on the floor F and the second rail can be represented by the lower rail 11 secured to the seat S. In this case, the lock mechanism (the lock unit) can be fixedly attached to the lower rail 11 secured to the seat S.

EXAMPLE 6

According to the above descriptions, the elastic bodies SP1 and SP2, which biases the lock members 50 and 51 in the lock direction, are represented by torsion springs. Alternatively or in addition, the elastic bodies SP1 and SP2 can be represented by leaf springs and so on.

EXAMPLE 7

The configuration of each sliding member 41 is not limited to the above descriptions. For example, the number of rollers 43 attached to the retainer 42 can be one, two, three, or more.

EXAMPLE 8

According to the above descriptions, provided are the two sliding members 41 at both left and right sides between the lower rail 11 and the upper rail 12. That is, totally provided are the four sliding members 41 in the seat slide apparatus described above. However, the number of the sliding members 41 is not limited to the above and can be more than two.

EXAMPLE 9

The base plate 53 is not essential to achieve the present invention. The base plate 53 described above is employed for assembling the lock members 50 and 51 as a lock unit and serves to facilitate attaching the lock members 50 and 51 to the upper rail 12 and to stably secure the lock members 50 and 51 to the upper rail 12. Therefore, the lock members 50 and 51 can be secured to the upper rail 12 by fixing the pins 54 and 55, for example directly to the upper rail 12.

EXAMPLE 10

In addition to the above-described structure, engagement bores can be further provided at the first side walls 22 of the lower rail 11. In this case, the lock teeth 50a of the lock member 50 are engaged with the engagement bores of the two side walls of the lower rail 11 and the two side walls of the upper rail 12. Likewise, the lock teeth 51a of the lock member 51 are engaged with the engagement bores of the two side walls of the lower rail 11 and the two side walls of the upper rail 12. For example, the lock teeth 50a of the lock member 50 can be engaged in this order with the first side wall 32 of the upper rail 12, the second side wall 23 of the lower rail 11, the second side wall 33 of the upper rail 12 and the first side wall of the lower rail 11. Likewise, the lock teeth 51a of the lock member 51 can be engaged in the same manner.

EXAMPLE 11

Designing matters of the seat slide apparatus 1 of the above described embodiments and the seat slide apparatus 71 of the example 4 can be altered as needed within the scope of the present invention.

Other inventive aspects of the above illustrated embodiments are as follows. The seat slide apparatus of the embodiments is characterized in the lock members are pivotably supported by pins secured in a vehicle vertical direction in the space defined by the first rail and the second rail, and are operated to lock using a horizontal locking movement with the pins as pivot axes. According to this configuration, it is possible to operate the lock members effectively applying a space longitudinally extending in the space surrounded by the first and second rails, the same which leads to reducing a space required for the lock mechanism. As described above, the lock mechanism according to the embodiments and examples of the present invention, in terms of a structure that the lock members are housed in the space defined by the first and second rails, can effectively achieve downsizing of the seat slide apparatus adjusted to a vehicle.

Another inventive aspect is that the seat slide apparatus of the illustrated embodiments each have an operation plate, which is operatively associated with the lock members and operates for locking and unlocking the lock members, is housed in the space surrounded by the first and second rails. Each operation plate is provided with the oblong bores, by which the operation plate is allowed to operate in a longitudinal direction for relatively moving the second rail with the pins extending through the oblong bores and is not allowed to operate in vertical and lateral directions, and the operation plate is further provided with second guide bores, which the guide pins attached to, or projections formed at, the respective lock members are inserted into and guide the lock members to rotate between the lock position and the unlock position on the basis of the longitudinal operation of the operation plate. According to this configuration, housed in the space defined by the first and second rails is the operation plate, which operates the lock members to lock and unlock, as well as the lock members. Therefore, it is possible to downsize the entire structure of the seat slide apparatus. Moreover, according to this configuration, because the operation plate is operated in a direction being parallel with a moving direction (a longitudinal direction) of the second rail, it is possible to downsize the lock mechanism without being influenced by the lateral lengths of the first and second rails. The oblong bores 52a and 52b, through which the pins 54 and 55 extend, are structured as first guide bores, while the sloped bores 52c and 52d, through which the guide pins 58 and 59 extend, are structured as the second guide bores, as illustrated in FIG. 1.

Another inventive aspect is that the seat slide apparatus of the illustrated embodiments each comprise sliding members which include: rollers slidably rotatable between the first rail and the second rail; and a retainer freely rotatably supporting the rollers. Provided are two sliding members at both left and right sides between the first rail and the second rail. According to this configuration, it is possible to stabilize a degree of sliding friction applied to the first and second rails relatively moving and to position the lock members and the sliding members so as not to mutually interfere.

Next, described below is a seat slide apparatus 1 according to a third embodiment of the present invention which is mounted, making a lateral pair, under the seat S of a vehicle, as is illustrated in FIG. 2.

The seat slide apparatus 1 is provided with the lower rail 11, which is fixedly mounted on a vehicle body such as the floor F and extends in a longitudinal direction, and the upper rail 12, which is secured to a bottom surface of the seat S and is mounted to be movable relative to the lower rail 11. According to the third embodiment of the present invention, the lower rail 11 serves as the first rail while the upper rail 12 serves as the second rail. Directions, such as "longitudinal", "lateral" and "vertical", which are mentioned herein, correspond to an orientation of a vehicle.

Figure 7:
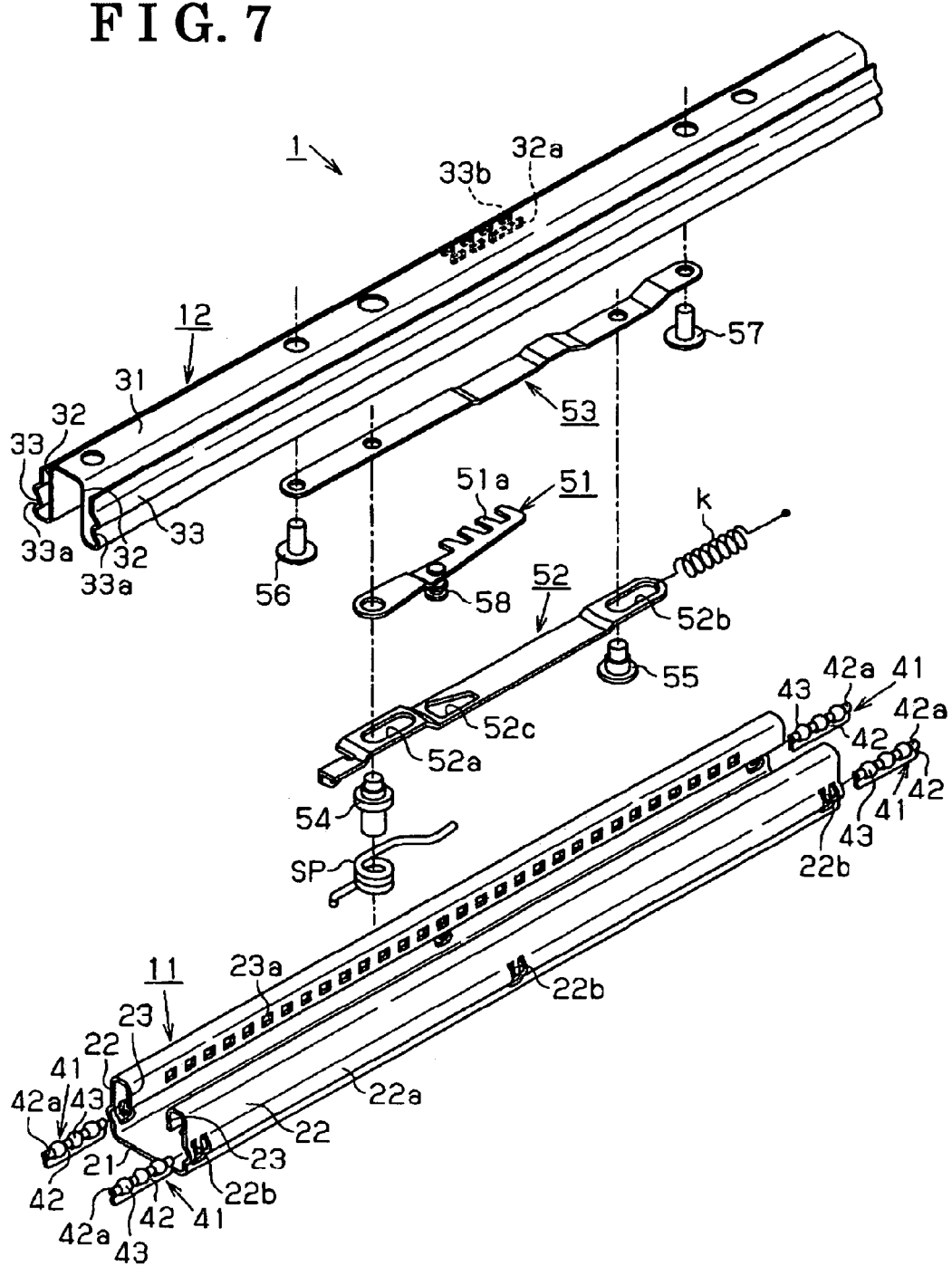
FIG. 7 is an exploded perspective view illustrating a configuration of a seat slide apparatus adjusted to a vehicle according to a third embodiment of the present invention.

As illustrated in FIG. 7, the lower rail 11 includes the bottom wall 21 fixed to the floor F of the vehicle, the first side walls 22 extending upwards from the left and right ends of the bottom wall 21 and making a lateral pair, and the second side walls 23 formed by bending downwards the upper end portions of the first side walls 22 and making a lateral pair. The lower rail 11 hence exhibits a laterally symmetrical cross section extending in a longitudinal direction. The upper rail 12 includes the upper wall 31 secured to the seat S, the first side walls 32 extending downwards from the left and right ends of the upper wall 31 and making a lateral pair, and the second side walls 33 formed by bending upwards the lower end portions of the first side walls 32 and making a lateral pair. The upper rail 12 hence exhibits a laterally symmetrical cross section extending in the longitudinal direction. The lower rail 11 and the upper rail 12 are mechanically associated with each other in such a manner that the second side walls 23 of the lower rail 11 are interposed between the corresponding first side wall 32 and the corresponding second side wall 33, of the upper rail 12.

The two sliding members 41 are provided between the first side wall 22 of the lower rail 11 and the second side wall 33 of the upper rail 12 at each side (left and right) of the seat slide apparatus 1, the sliding members 41 which are slidably movable in response to a longitudinal movement of the upper rail 12 relative to the lower rail 11. Each sliding member 41 is an assembly having the flat plate-type retainer 42 exhibiting adequate rigidity and made of metal material and the at least one spherically-shaped roller 43 exhibiting adequate rigidity. The roller 43 is supported to be freely rotatable by the curled portion 42a formed at the upper end of the retainer 42. According to the third embodiment of the present invention, provided are three rollers 43 attached, longitudinally equidistant from each adjacent one, to the curled portion 42a of the retainer 42.

At the one side, and the other side, of the seat slide apparatus 1 respectively, the first side wall 22 of the lower rail 11 is formed or provided with the arc-shaped cross sectional portion 22a which supports the rollers 43 for their free rotation, while the second side wall 33 of the upper rail 12 is formed or provided with the arc-shaped cross sectional portion 33a which also supports the rollers 43 for their free rotation. As is apparent from FIG. 8, the rollers 43 of each sliding member 41 are press-fitted into a space between the arc-shaped cross sectional portions 22a and 33a. At a time that the rollers 43 rotate between the arc-shaped cross sectional portions 22a and 33a in response to a movement of the upper rail 12 relative to the lower rail 11, each sliding member 41 is translated in the longitudinal direction with the upper rail 12.

As illustrated in FIG. 7, the at least one stopper 22b is formed or provided at the arc-shaped cross sectional portion 22a of the first side wall 22 of the lower rail 11, at the one side, and at the other side, of the seat slide apparatus 1 respectively. According to the third embodiment of the present invention, provided are the three stoppers 23b; the first one of which is positioned at a longitudinal front end of the lower rail 11; the second one of which is positioned at a longitudinal rear end of the lower rail 11; and the third one of which is positioned at a substantially longitudinal intermediate portion of the lower rail 11. Once the curled portion 42a of the retainer 42 of each sliding member 41 comes in contact with the stopper 22b of the lower rail 11, each sliding member 41 is restrained from further movement in the longitudinal direction. In other words, according to the third embodiment of the present invention, an operational range of each sliding member 41 is designed to substantially meet a half of the entire length of the lower rail 11. In this case, for example, each sliding member 41 can be translated half of an operation distance of the upper rail 12 relative to the lower rail 11.

Next, described below is a lock mechanism according to the third embodiment of the present invention.

As is illustrated in FIG. 7, incorporated between a space defined by the lower rail 11 and the upper rail 12 is a lock member 51 which physically locks the upper rail 11 and the lower rail 12 at plural lock positions (longitudinal direction) and restrains or locks a longitudinal movement of the upper rail 12 relative to the lower rail 11. The space defined by the lower rail 11 and the upper rail 12 represents herein an inner space defined or surrounded by the bottom wall 21 of the lower rail 11, the pair of first side walls 22 of the lower rail 11, the sliding members 41, the pair of second side walls 33 of the upper rail 12, the pair of first side walls 32 of the upper rail 12, and the upper wall 31 of the upper rail 12 (see FIG. 8).

The lock member 51 is operatively associated with the upper rail side 12. More specifically, the lock member 51 is operatively associated with an operation plate 52 and is secured to the upper rail 12 via a base plate 53 supporting the operation plate 52 to be movable in the longitudinal direction. The operation plate 52 and the base plate 53 are formed to be an approximately long plate made of metal material having adequate rigidity. The operation plate 52 is supported by the base plate 53 by means of pins 54 and 55. The base plate 53 is secured to the upper rail 12 by means of the rivets 56 and 57. The lock member 51 is provided as a lock unit having the operation plate 52, the base plate 53, the pins 54 and 55, the rivets 56 and 57 and an elastic body SP (described later). This lock unit is then secured to the upper rail 12 by means of the rivets 56 and 57.

The lock member 51 is made of metal material exhibiting adequate rigidity and is formed to be substantially comb-shaped. More specifically, the lock member 51 is formed with lock teeth 51*a* engageable with the engagement bores 23*a*, 32*a* and 33*b*. The engagement bores 23*a*, 32*a* and 33*b* are described in detail later. The lock teeth 51*a* are constantly biased by the elastic body SP in a direction to be engaged with the engagement bores 23*a*, 32*a* and 33*b*.

The lock member 51 is arranged in a vertical space between the operation plate 52 and the base plate 53 and is pivotably supported by means of the pin 54. The lock member 51 is operatively pivoted at a horizontal surface with the pin 54 as a pivot axis. The operation plate 52 is provided with the oblong bores 52*a* and 52*b* at longitudinal both ends thereof. The pins 54 and 55 being fitted into the oblong bores 52*a* and 52*b* are fixed to the base plate 53 in a condition where the lock member 51 is pivotally supported by the pin 54. Therefore, by virtue of the pins 54 and 55 fitted into the oblong bores 52*a* and 52*b*, which serve as guides, the operation plate 52 is restrained or locked from vertical and lateral movements and is allowed to move only in the longitudinal direction.

The operation plate 52 is formed or provided with a sloped bore 52*c* which is positioned at an approximately central portion of the operation plate 52 and adjacent to the oblong bore 52*a*. The sloped bore 52*c* exhibits a flat and approximately triangle shape and possesses different lateral widths at front and rear ends thereof. More specifically, the sloped bore 52*c* possesses a superior or large lateral width at a front end thereof and an inferior or small lateral width at a rear end thereof. As illustrated in FIG. 7, the sloped bore 52*c* is fitted with a guide pin 58 securely attached to the lock member 51. In response to a longitudinal movement of the operation plate 52, the guide pin 58 can shift along an inner wall surface between the front end having the large lateral width and the rear end having the small lateral width, of the sloped bore 52*c*. When the guide pin 58 shifts to the front end having the large lateral width of the sloped bore 52*c*, the lock member 51 is pivoted to a lock position, which corresponds to the engagement position of the lock teeth 51*a* with the engagement bores 23*a*, 32*a* and 33*b*. When the guide pin 58 shifts to the rear end having the small lateral width of the sloped bore 52*c*, the lock member 51 is pivoted to an unlock position (a disengagement position). That is, when the guide pin 58 shifts along the sloped bore 52*c* in response to a longitudinal movement of the operation plate 52, the lock member 51 is operated to lock and unlock a relative movement between lower rail 11 and the upper rail 12 with the pin 54 as a pivot axis. According to the third embodiment of the present invention, the guide pin 58 is attached to the lock member 51 as an independent component. Alternatively, the guide pin 58 can be integrally formed with the lock member 51, such as a projection.

Figure 9:
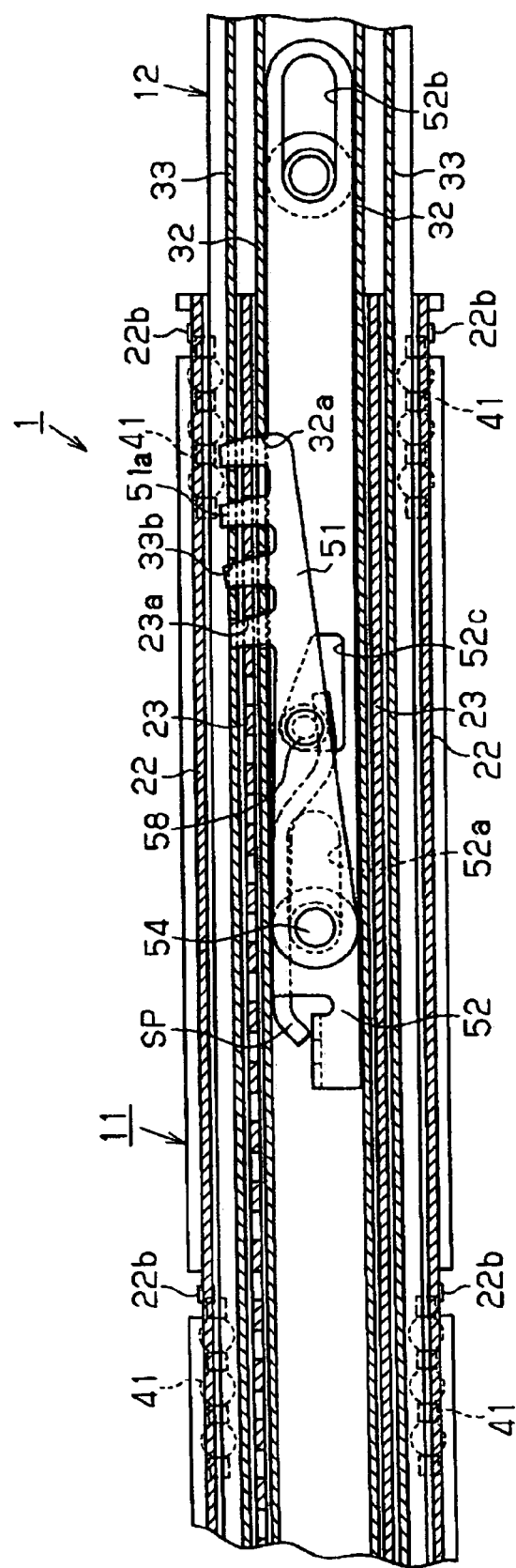
FIG. 9 is an overhead cross sectional view illustrating the seat slide apparatus according to the third embodiment.

As illustrated in FIG. 7, the operation plate 52 is connected with an initial position return elastic body k for biasing constantly the operation plate 52 in such a manner that the guide pin 58 is shifted towards the front end having a large lateral width, i.e., in the lock direction. When the operation plate 52 is operated, in response to operation of an operation handle (not illustrated), against a biasing force of the initial position return elastic body k, it is possible to operate the lock member 51 to unlock a relative movement of the upper rail 12 and the lower rail 11. On the other hand, once the operation of the operation handle is discontinued after the aforementioned operation of the operation plate 52, the lock member 51 can be returned to, or maintained at, a lock position by virtue of a biasing force of the initial position return elastic body k and a biasing force of each elastic body SP biasing the lock member 51 to the lock direction. According to the third embodiment of the present invention, the elastic body SP is configured with a torsion spring. More specifically, the torsion spring SP is fitted into the pin 54 and one end of the torsion spring SP is hooked at the guide pin 58. Therefore, the torsion spring SP effectively biases the lock member 51 in the lock direction, i.e., in a counterclockwise direction in FIG. 9.

Next, described below are the engagement bores 23*a* of the lower rail 11 and the engagement bores 32*a* and 33*b* of the upper rail 12.

As illustrated in FIG. 7, the engagement bores 23*a* of the lower rail 11 extend continuously and longitudinally with a pitch equally spaced between each adjacent bore 23*a* corresponding to a longitudinal movement range of the upper rail 12. More specifically, the engagement bores 23*a* extend continuously and longitudinally at only one (e.g., an upper side in FIG. 9) of the second side walls 23 with a pitch equally spaced between each adjacent bore 23*a* corresponding to a longitudinal movement range of the upper rail 12. Meanwhile, the engagement bores 32*a* and 33*b* are formed at the first and second side walls 32 an 33 of the upper rail 12, the first and second side walls 32 and 33 which are laterally at the same side as the one of the second side walls 23 having the engagement bores 23*a*. The engagement bores 32*a* and 33*b* are hence positioned at the upper rail 12 in such a manner that the lock teeth 51*a* of the lock member 51 are engaged therewith, such as approximately longitudinal intermediate position of the upper rail 12.

As described above, the lock teeth 51*a* of the lock member 51, which is housed in the space defied or surrounded by the lower rail 11 and the upper rail 12, are operatively engaged with the engagement bores of the lower rail 11 and the engagement bores 32*a* and 33*b* of the upper rail 12. Here, it can be underlined that, the lock teeth 51*a* are engaged with the engagement bores 23*a*, 32*a* and 33*b* crossing over the second side wall 23 of the lower rail 11, and the first and second side walls 32 and 33 of the upper rail 12, between which the second side wall 23 of the lower rail 11 interpose. That is, because the lock teeth 51*a* are engaged with the engagement bores 33*b* of the second side wall 33 (laterally outside of the second side wall 23) of the upper rail 12 as well as with the engagement bores 32*a* of the first side wall 32 of the upper rail 12 and the engagement bores 23*a* of the second side wall 23 of the lower rail 11, a lock mechanism becomes a bar-tacking structure. In such a case, compared with a structure in which the lock teeth 51*a* are engaged with a single side wall of the lower rail 11 and a single side wall of the upper rail 12, it is possible to enhance a degree of shearing strength of the lock member 51, and to further enhance a degree of locking strength of the lock member 51.

Next, described below is a physical relationship between the locking position of the lock member 51 and each sliding member 41.

Figure 8:
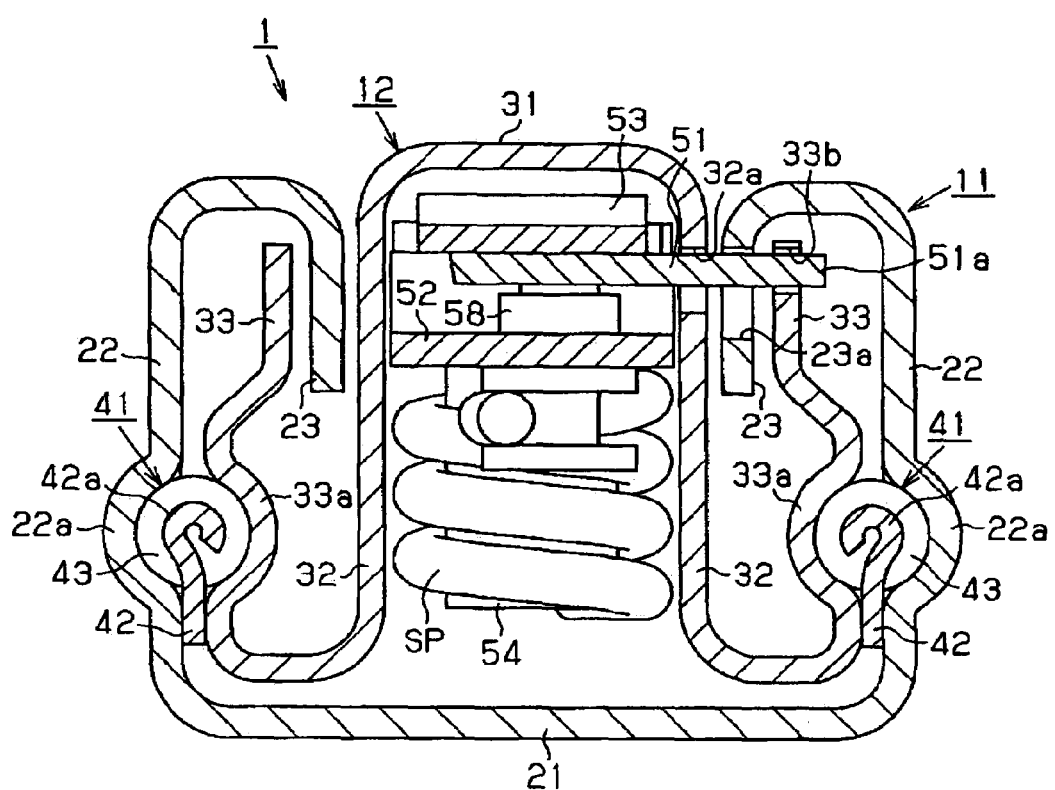
FIG. 8 is a longitudinal cross sectional view illustrating the seat slide apparatus according to the third embodiment.

As illustrated in FIG. 8, according to the third embodiment of the present invention, when the lock member 51 is operated in the lock direction, a sliding position of each sliding member 41 between the lower rail 11 and the upper rail 12 does not interfere in an engagement position of the lock member 51 with the engagement bores 23*a*, 32*a* and 33*b*, and vice versa. More specifically, each sliding member 41 is positioned downsides of a vertically intermediate position between the lower rail 11 and the upper rail 12, while the lock member 51 is positioned upsides of the vertically intermediate position therebetween. As described above, because each sliding member 41 is positioned at a vertical height different from the o lock member 51, and each sliding member 41 can operate at a position not interfering in the lock member 51, vice versa, a longitudinal length of each sliding member 41 is not unnecessarily responsive to a longitudinal length of the lock mechanism and can be controlled at the minimum length possible. In other words, without being influenced by the length, of each sliding member 41 and the lock mechanism, the lengths of the lower rail 11 and the upper rail 12 can be controlled at the minimum length possible that substantially satisfies a moving amount of the upper rail 12, the same which effectively leads to further downsizing of the seat slide apparatus 1 adjusted to a vehicle.

As described above, in the seat slide apparatus 1 according to the third embodiment of the present invention, the lock teeth 51*a* are engaged with the engagement bores 23*a*, 32*a* and 33*b* of the lower rail 11 and the upper rail 12. Consequently, a longitudinal movement of the upper rail 12 relative to the lower rail 11 can be effectively restrained or locked, and the seat S is hence held at a predetermined position relative to the floor F. Once the operation plate 52 is operated, in response to operation of the operation handle, against a biasing force of the initial position return elastic body k, the guide pin 58 is shifted to the rear end having the small lateral width of the sloped bore 52*c* against a biasing force of the elastic body SP, and as a consequence, the lock member 51 is operated to unlock the relative movement of the lower rail 11 and the upper rail 12. In the course thereof, the lock teeth 51*a* are released from being engaged with the engagement bores 23*a*, 32*a* and 33*b*. Therefore, the upper rail 12 is allowed to move relative to the lower rail 11, and the seat S is allowed to slide longitudinally relative to the floor F. As described above, it is possible to adjust a longitudinal position of the seat S relative to the floor F.

At least the following effects can be exerted according to the seat slide apparatus 1 according to the third embodiment of the present invention.

(1) The lock member 51, which locks the lower rail 11 and the upper rail 12 at plural engagement positions or stages and restrains a relative movement of the upper rail 12 relative to the lower rail 11, is housed in the space surrounded by the lower rail 11 and the upper rail 12. Therefore, it is possible to reduce an entire size of the seat slide apparatus 1 adjusted to a vehicle.

(2) Each sliding member 41 is positioned at a vertical position (height) being different from a vertical position (height) of the lock member 51, and the lock member 51 does not interfere in each sliding member 41, vice versa. Therefore, a longitudinal length of each sliding member 41 is not influenced by a longitudinal length of the lock mechanism, vice versa, and can be controlled at the minimum length possible. In other words, without being influenced by the length, of each sliding member 41 and the lock mechanism, the lengths of the lower rail 11 and the upper rail 12 can be controlled at the minimum length possible that substantially satisfies a moving amount of the upper rail 12, the same which effectively leads to downsizing of the seat slide apparatus 1 adjusted to a vehicle.

(3) The lock teeth 51*a* are brought into engagement with the second side wall 23 of the lower rail 11, the first side wall 32 and the second side wall 33 of the upper rail 12, between which the second side wall 23 interposes. In such a case, the lock mechanism is a bar-tacking structure, and it is possible to enhance a degree of locking strength of the lock mechanism.

The present invention can be applied to the following examples modified on the basis of the third embodiment.

EXAMPLE 1

According to the third embodiment, the first rail is represented by the lower rail 11 fixed to the floor F and the second rail is represented by the upper rail 12 secured to the seat S. Alternatively, the first rail can be represented by the upper rail 12 fixedly mounted on the floor F and the second rail can be represented by the lower rail 11 secured to the seat S. In this case, the lock mechanism (the lock unit) can be fixedly attached to the lower rail 11 secured to the seat S.

EXAMPLE 2

According to the third embodiment, the elastic body SP, which biases the lock member 51 in the lock direction, is represented by a torsion spring. Alternatively, the elastic body SP can be represented by a leaf spring and so on.

EXAMPLE 3

According to the third embodiment, the lock member 51 is operated at a horizontal surface. However, it is not limited to the above. As far as the lock member 51 does not interfere in sliding movement of each sliding member 41, in order to lock, the lock member 51 can be operated in a flat surface perpendicular to a horizontal surface for example.

EXAMPLE 4

The configuration of each sliding member 41 is not limited to the above descriptions. For example, the number of rollers 43 attached to the retainer 42 can be one, two, three, or more.

EXAMPLE 5

According to the third embodiment, provided are the two sliding members 41 at both left and right sides between the lower rail 11 and the upper rail 12. That is, totally provided are the four sliding members 41 in the seat slide apparatus described above. However, the number of the sliding members 41 is not limited to the above and can be more than two.

EXAMPLE 6

The base plate 53 is not essential to achieve the present invention. The base plate 53 described above is employed for assembling the lock member 51 as a lock unit and serves to facilitate attaching the lock member 51 to the upper rail 12 and to stably secure the lock member 51 to the upper rail 12. Therefore, the lock member 51 can be secured to the upper rail 12 by fixing the pin 54, for example directly to the upper rail 12.

EXAMPLE 7

In addition to the above-described structure, engagement bores can be further provided at the first side walls 22 of the lower rail 11. In this case, the lock teeth 51a of the lock member 51 are engaged with the engagement bores of the two side walls of the lower rail 11 and the two side walls of the upper rail 12. For example, the lock teeth 51a of the lock member 51 can be engaged in this order with the first side wall 32 of the upper rail 12, the second side wall 23 of the lower rail 11, the second side wall 33 of the upper rail 12 and the first side wall of the lower rail 11.

EXAMPLE 8

Designing matters of the seat slide apparatus 1 of the above described embodiments and the seat slide apparatus 71 of the example 4 can be altered as needed within the scope of the present invention.

Other inventive aspects of the above-illustrated embodiment is as follows. The seat slide apparatus of the embodiment is characterized in that the operation plate, which is operatively associated with the lock member and operates for locking and unlocking the lock member, is housed in the space surrounded by the first and second rails, the operation plate is provided with the oblong bore, by which the operation plate is allowed to operate in a longitudinal direction for relatively moving the second rail with the pin extending through the oblong bores and is not allowed to operate in vertical and lateral directions, and the operation plate is further provided with a second guide bore, which the guide pin is attached to, or a projection formed at, the lock member is inserted into and guides the lock member to rotate between the lock position and the unlock position on the basis of the longitudinal operation of the operation plate. According to this configuration, housed in the space defined by the first and second rails is the operation plate, which operates the lock member to lock and unlock, as well as the lock member. Therefore, it is possible to downsize the entire structure of the seat slide apparatus. Moreover, according to this configuration, because the operation plate is operated in a direction being parallel with a moving direction (a longitudinal direction) of the second rail, it is possible to downsize the lock mechanism without being influenced by the lateral lengths of the first and second rails. The oblong bore 52a, through which the pin 54 extends, are structured as a first guide bore, while the sloped bores 52c, through which the guide pin 58 extend, is structured as the second guide bore, as illustrated in FIG. 7.

Another inventive aspect is that the seat slide apparatus of the illustrated embodiment is characterized in that each sliding member includes: rollers slidably rotatable between the first rail and the second rail; and a retainer freely rotatably supporting the rollers. Provided are two sliding members at both left and right sides between the first rail and the second rail. According to this configuration, it is possible to stabilize a degree of sliding friction applied to the first and second rails relatively moving and to position the lock member and the sliding members so as not to mutually interfere.

The principles, the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat slide apparatus for a vehicle comprising:
   a first rail fixedly mounted on a vehicle;
   a second rail secured to a seat and mounted to be longitudinally slidable relative to the first rail;
   a sliding member arranged between the first rail and the second rail and slidably movable in response to a relative movement between the first rail and the second rail; and
   a first lock member and a second lock member each associated with the second rail and movable with the second rail, each of the first and second lock members provided to be engageable with engagement bores provided at the first rail and the second rail and being biased in a direction to be engaged with the engagement bores, each of the first and second lock members being accommodated in a space defined by the first rail and the second rail, wherein the second lock member is disengaged from the engagement bores of the first rail when the first lock member is engaged with the engagement bores of the first rail.

2. A seat slide apparatus for a vehicle according to claim 1, wherein a movement position of the sliding member between the first rail and the second rail is positioned so as not to mutually interfere in a position at which the first and second lock members are engaged with the engagement bores.

3. A seat slide apparatus for a vehicle according to claim 2, wherein
   the first rail comprises:
   a bottom wall;
   first side walls extending upwards from left and right ends of the bottom wall and making a lateral pair; and
   second side walls formed by bending downwards upper end portions of the first side walls, and
   the second rail comprises:
   an upper wall;
   first side walls extending downwards from left and right ends of the upper wall and making a lateral pair; and
   second side walls formed by bending upwards lower end and portions of the first side walls and making a lateral pair,
   wherein the first rail and the second rail are assembled with the second side walls of the first rail interposing between the corresponding first side wall and the corresponding second side wall, of the second rail, and
   wherein the engagement bores are provided continuously and longitudinally at at least one of the second side walls of the first rail and are provided at the position at which one of the first and second lock member members is engaged with the first and second side walls of the second rail corresponding to the at least one of the second side walls.

4. A seat slide apparatus for a vehicle according to claim 3, wherein the engagement bores are provided continuously and longitudinally at the pair of second side walls of the first rail with a pitch equally spaced between each adjacent bore and in a symmetrical manner in a vehicle lateral direction, and wherein the position, at which the one of the first lock member and the second lock member is engaged, is shifted, between the first and second lock members based upon the equally spaced pitch for the engagement bores, every shifting amount obtained by "pitch/the number of lock members".

5. A seat slide apparatus for a vehicle according to claim 3, wherein the engagement bores are provided continuously and longitudinally at the pair of second side walls of the first rail with a pitch equally spaced between each adjacent bore and are shifted, in a longitudinal direction between the pair of second side walls, every shifting amount obtained by "pitch/the number of lock members", and wherein the position at which the one of the first and second lock members is engaged with the first and second side walls of the second rail, is provided in a symmetrical manner in a vehicle lateral direction relative to the corresponding first and second side walls of the second rail.

6. A seat slide apparatus for a vehicle according to claim 3, wherein the first lock member and the second lock member are housed in the space defined by the first rail and the second rail in such a manner that a movement position of the sliding member between the first rail and the second rail is positioned so as not to mutually interfere in the position at which the one of the first and second lock members is engaged with the first and second side walls corresponding to the at least one of the second side walls.

7. A seat slide apparatus for a vehicle according to claim 2, wherein the first lock member and the second lock member are pivotably supported by pins secured in a vehicle vertical direction in the space defined by the first rail and the second rail, and the first lock member and the second lock member are operated to lock in a horizontal surface with the pin as a pivot axis.

8. A seat slide apparatus for a vehicle according to claim 1, wherein a movement position of the sliding member between the first rail and the second rail is positioned so as not to mutually interfere in a position at which the one of the first lock member and of the second lock member is engaged with the engagement bores.

9. A seat slide apparatus for a vehicle according to claim 8, wherein
the first rail comprises:
a bottom wall;
first side walls extending upwards from left and right ends of the bottom wall and making a lateral pair; and
second side walls formed by bending downwards upper end portions of the first side walls, and
the second rail comprises:
an upper wall;
first side walls extending downwards from left and right ends of the upper wall and making a lateral pair; and
second side walls formed by bending upwards lower end portions of the first side walls and making a lateral pair,
wherein the first rail and the second rail are assembled with the second side walls of the first rail interposing between the corresponding first side wall and the corresponding second side wall, of the second rail, and
wherein the engagement bores are provided continuously and longitudinally at at least one of the second side walls of the first rail and provided at the position at which one of the first lock member and the second lock member is engaged with the first and second side walls of the second rail corresponding to the at least one of the second side walls.

10. A seat slide apparatus for a vehicle according to claim 9, wherein the engagement bores are provided continuously and longitudinally at the pair of second side walls of the first rail with a pitch equally spaced between each adjacent bore and in a symmetrical manner in a vehicle lateral direction, and wherein the position, at which the one of the first lock member and the second lock member is engaged, is shifted, between the first and second lock members based upon the equally spaced pitch for the engagement bores, every shifting amount obtained by "pitch/the number of lock members".

11. A seat slide apparatus for a vehicle according to claim 9, wherein the engagement bores are provided continuously and longitudinally at the pair of second side walls of the first rail with a pitch equally spaced between each adjacent bore and are shifted, in a longitudinal direction between the pair of second side walls, every shifting amount obtained by "pitch/the number of lock members", and wherein the position, at which the one of the first and second lock members is engaged with the first and second side walls of the second rail, is provided in a symmetrical manner in a vehicle lateral direction relative to the corresponding first and second side walls of the second rail.

12. A seat slide apparatus for a vehicle according to claim 9, wherein the first lock member and the second lock member are housed in the space defined by the first rail and the second rail in such a manner that a movement position of the sliding member between the first rail and the second rail is positioned so as not to mutually interfere in the position at which the one of the first lock member and the second lock member is engaged with the first and second side walls corresponding to the at least one of the second side walls.

13. A seat slide apparatus for a vehicle according to claim 1, wherein
the first rail comprises:
a bottom wall;
first side walls extending upwards from left and right ends of the bottom wall and making a lateral pair; and
second side walls formed by bending downwards upper end portions of the first side walls, and
the second rail comprises:
an upper wall;
first side walls extending downwards from left and right ends of the upper wall and making a lateral pair; and
second side walls formed by bending upwards lower end portions of the first side walls and making a lateral pair,
wherein the first rail and the second rail are assembled with the respective second side walls of the first rail interposing between the corresponding first side wall and the corresponding second side wall, of the second rail, and wherein the engagement bores are provided continuously and longitudinally at at least one of the second side walls of the first rail and are provided at a position at which the first lock member is engaged with the first and second side walls of the second rail corresponding to the at least one of the second side walls.

14. A seat slide apparatus for a vehicle according to claim 13, wherein the first lock member and the second lock member are housed in the space defined by the first rail and the second rail in such a manner that a movement position of the sliding member between the first rail and the second rail is positioned so as not to mutually interfere in the position at which the first lock member is engaged with the first and second side walls corresponding to the at least one of the second side walls.

15. A seat slide apparatus for a vehicle according to claim 1, wherein
the first rail comprises:
a bottom wall;
first side walls extending upwards from left and right ends of the bottom wall and making a lateral pair; and
second side walls formed by bending downwards upper end portions of the first side walls, and
the second rail comprises:
an upper wall;
first side walls extending downwards from left and right ends of the upper wall and making a lateral pair; and
second side walls formed by bending upwards lower end portions of the first side walls and making a lateral pair,
wherein the first rail and the second rail are assembled with the respective second side walls of the first rail interposing between the corresponding first side wall and the corresponding second side wall, of the second rail, and
wherein the engagement bores are provided continuously and longitudinally at at least one of the second side walls of the first rail and are provided at a position at which one of the first lock member and the second lock member is engaged with the first and second side walls of the second rail corresponding to the at least one of the second side walls.

16. A seat slide apparatus for a vehicle according to claim 15, wherein the engagement bores are provided continuously and longitudinally at the pair of second side walls of the first rail with a pitch equally spaced between each adjacent bore and in a symmetrical manner in a vehicle lateral direction, and wherein the position, at which the one of the first lock member and the second lock member is engaged, is shifted, between the first and second lock members based upon the equally spaced pitch for the engagement bores, every shifting amount obtained by "pitch/the number of lock members".

17. A seat slide apparatus for a vehicle according to claim 15, wherein the engagement bores are provided continuously and longitudinally at the pair of second side walls of the first rail with a pitch equally spaced between each adjacent bore and are shifted, in a longitudinal direction between the pair of second side walls, every shifting amount obtained by "pitch/the number of lock members", and wherein the position, at which the one of the first and second lock members is engaged with the first and second side walls of the second rail, is provided in a symmetrical manner in a vehicle lateral direction relative to the corresponding first and second side walls of the second rail.

18. A seat slide apparatus for a vehicle according to claim 15, wherein the first lock member and the second lock member are housed in the space defined by the first rail and the second rail in such a manner that a movement position of the sliding member between the first rail and the second rail is positioned so as not to mutually interfere in the position at which the one of the first lock member and the second lock member is engaged with the first and second side walls corresponding to the at least one of the second side walls.

19. A seat slide apparatus for a vehicle according to claim 1, wherein the first lock member and the second lock member are pivotably supported by pins secured in a vehicle vertical direction in the space defined by the first rail and the second rail, and the first lock member and the second lock member are operated to lock in a horizontal surface with the pins as pivot axes.

* * * * *